United States Patent
Sivasubramanian et al.

(10) Patent No.: US 9,983,900 B2
(45) Date of Patent: May 29, 2018

(54) CAPACITY RISK MANAGEMENT FOR VIRTUAL MACHINES

(71) Applicant: BMC SOFTWARE, INC., Houston, TX (US)

(72) Inventors: Jeyashree Sivasubramanian, Wayland, MA (US); Sudheer Apte, Walpole, MA (US)

(73) Assignee: BMC Software, Inc., Houston, TX (US)

(*) Notice: Subject to any disclaimer, the term of this patent is extended or adjusted under 35 U.S.C. 154(b) by 0 days. days.

(21) Appl. No.: 15/335,349

(22) Filed: Oct. 26, 2016

(65) Prior Publication Data
US 2017/0046191 A1 Feb. 16, 2017

Related U.S. Application Data

(63) Continuation of application No. 14/319,918, filed on Jun. 30, 2014, now Pat. No. 9,483,299.

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5061* (2013.01); *G06F 9/5077* (2013.01); *G06F 11/30* (2013.01); *G06F 11/301* (2013.01); *G06F 11/3065* (2013.01); *G06F 11/3433* (2013.01); *G06F 11/3442* (2013.01); *G06F 11/3452* (2013.01); *G06F 2009/45591* (2013.01); *G06F 2201/81* (2013.01); *G06F 2201/815* (2013.01)

(58) Field of Classification Search
CPC .. G06F 9/45558; G06F 9/5061; G06F 9/5077; G06F 11/30; G06F 11/301; G06F 11/3065; G06F 11/3433; G06F 11/3442; G06F 11/3452; G06F 2009/45591; G06F 2201/81; G06F 2201/815
USPC .......................................................... 718/1
See application file for complete search history.

(56) References Cited

U.S. PATENT DOCUMENTS 6,961,941 B1 * 11/2005 Nelson ................ G06F 9/45533 719/310
7,203,944 B1 * 4/2007 van Rietschote ... G06F 9/45533 718/1

(Continued)

OTHER PUBLICATIONS

Almutairi et al. "Risk-Aware Management of Virtual Resources in Access Controlled Service-oriented Cloud Datacenters", 2015, IEEE.*

(Continued)

*Primary Examiner* — Anna Deng
*Assistant Examiner* — Junchun Wu
(74) *Attorney, Agent, or Firm* — Brake Hughes Bellermann LLP

(57) ABSTRACT

An access data collector collects access assignment data characterizing active access assignment operations of a hypervisor in assigning host computing resources among virtual machines for use in execution of the virtual machines. Then, a capacity risk indicator calculator calculates a capacity risk indicator characterizing a capacity risk of the host computing resources with respect to meeting a prospective capacity demand of the virtual machines, based on the access assignment data.

15 Claims, 5 Drawing Sheets

(51) Int. Cl.
  *G06F 11/30* (2006.01)
  *G06F 11/34* (2006.01)

(56) References Cited

U.S. PATENT DOCUMENTS

| | | | |
|---|---|---|---|
| 7,975,165 B2* | 7/2011 | Shneorson | G06Q 10/06 714/3 |
| 8,479,276 B1 | 7/2013 | Vaystikh et al. | |
| 8,589,203 B1 | 11/2013 | Collins et al. | |
| 8,732,310 B2* | 5/2014 | Breitgand | G06F 9/45558 718/1 |
| 2007/0150690 A1* | 6/2007 | Chen | G06F 3/0608 711/170 |
| 2008/0244569 A1* | 10/2008 | Challener | G06F 21/57 718/1 |
| 2010/0250868 A1* | 9/2010 | Oshins | G06F 12/0284 718/1 |
| 2010/0269109 A1 | 10/2010 | Cartales | |
| 2011/0154330 A1* | 6/2011 | Axnix | G06F 9/45533 718/1 |
| 2012/0096165 A1 | 4/2012 | Madduri et al. | |
| 2012/0233613 A1 | 9/2012 | Shimogawa | |
| 2012/0324441 A1* | 12/2012 | Gulati | G06F 9/5088 718/1 |
| 2012/0324444 A1* | 12/2012 | Gulati | G06F 9/5088 718/1 |
| 2013/0042123 A1 | 2/2013 | Smith | |
| 2013/0050246 A1 | 2/2013 | Barry | |
| 2013/0104124 A1 | 4/2013 | Tsirkin | |
| 2013/0212422 A1 | 8/2013 | Bauer et al. | |
| 2013/0247044 A1 | 9/2013 | Bingham | |
| 2013/0247056 A1 | 9/2013 | Hattori | |
| 2014/0019965 A1* | 1/2014 | Neuse | G06F 9/45533 718/1 |
| 2014/0019966 A1* | 1/2014 | Neuse | G06F 9/45533 718/1 |
| 2014/0089511 A1 | 3/2014 | McLean | |
| 2014/0196035 A1* | 7/2014 | Ishikawa | G06F 9/45558 718/1 |
| 2014/0229949 A1* | 8/2014 | Cai | G06F 9/45533 718/1 |
| 2014/0258446 A1* | 9/2014 | Bursell | G06F 15/177 709/217 |
| 2015/0058617 A1* | 2/2015 | Oishi | G06F 9/5094 713/100 |
| 2015/0067143 A1* | 3/2015 | Babakhan | G06F 11/301 709/224 |
| 2015/0193247 A1 | 7/2015 | Dong | |
| 2015/0378764 A1 | 12/2015 | Sivasubramanian | |

OTHER PUBLICATIONS

Kiran et al. "Towards a Service Lifecycle based Methodology for Risk Assessment in Cloud Computing", 2011, IEEE.*
Halder et al. "Risk Aware Provisioning and Resource Aggregation based Consolidation of Virtual Machines",2012, IEEE.*
Andreolini et al. "Dynamic Load Management of Virtual Machines in Cloud Architectures", 2009, LNICST 34, pp. 201-214,2010.*
"Capacity Planning & Management with vCenter Operation Manager 5.0", VMware, Inc., retrieved from: http://blogs.vmware.com/management/2012/03/capacity-management-with-vcenter-operation-manager-50.html, Mar. 30, 2012, 4 pages.
"VMware vCenter Operations Manager Getting Started Guide", VMware, Inc., 2012, 112 pages.
Andreolini, et al., "Dynamic Load Management of Virtual Machines in Cloud Architectures", 2010, LNICST, pp. 201-214.
Bauer, "Capacity Management Is Crucial in Virtualized Environments", TeamQuest, 2010, 9 pages.
EP15173706.1, "Extended European Search Report Received", dated Jan. 5, 2016, 10 pages.
Halder, et al., "Risk Aware Provisioning and Resource Aggregation based Consolidation of Virtual Machines", IEEE, 2012.

* cited by examiner

CAPACITY RISK MANAGEMENT FOR VIRTUAL MACHINES

CROSS-REFERENCE TO RELATED APPLICATION

This application is a divisional of, and claims priority to, U.S. patent application Ser. No. 14/319,918, filed on Jun. 30, 2014, the disclosure of which is hereby incorporated by reference in its entirety.

TECHNICAL FIELD

This description relates to capacity risk management for virtual machines.

BACKGROUND

Virtualization refers to techniques in which software-based virtual machines are created using underlying computer hardware resources. Such virtual machines are thus software constructs which share underlying hardware resources, such as processing and memory resources, but which are otherwise operated and utilized as separate, distinct computing platforms.

Using such virtualization technology, for example, a single computer may be enabled to provide two or more virtual machines, where each such virtual machine may be configured with a different operating system, a different set of available applications, and various other differences and configuration parameters. Moreover, it is possible to dynamically share or allocate the available hardware resources among the existing virtual machines running thereon, e.g., to create new virtual machines, destroy existing virtual machines, relocate a virtual machine from one hardware platform to another, or otherwise manage the deployment and use of virtual machines in a flexible manner. As a result, it is possible to provide a wide range of computing features and functions, in a manner which makes efficient and cost effective use of available hardware resources.

Further, when combined with networking techniques, virtualization technology provides for an ability to provide remote access to virtual machines, for the use thereof by consumers, employees, or other users. In such contexts, it is frequently necessary to provide a large number of such users with desired virtual machine resources, so that large quantities of available hardware resources also may be required in order to meet demands of the users of the various virtual machines.

When deploying hardware resources and associated virtual machines at such large scales, it may be difficult for owners, providers, or administrators to do so in a reliable, efficient, and cost-effective manner. Moreover, a number of virtual machines being deployed, as well as a number of resources assigned to each virtual machine, may change over time. As a result, failure to accurately assess and predict capacity requirements may result in an inability to provide a desired level of service to users of the virtual machines.

SUMMARY

According to one general aspect, a system includes instructions stored on a non-transitory computer readable storage medium and executable by at least one semiconductor processor. The system includes an access data collector configured to cause the at least one semiconductor processor to collect access assignment data characterizing active access assignment operations of a hypervisor in assigning host computing resources among virtual machines for use in execution of the virtual machines. The system also includes a capacity risk indicator calculator configured to cause the at least one semiconductor processor to calculate a capacity risk indicator characterizing a capacity risk of the host computing resources with respect to meeting a prospective capacity demand of the virtual machines, based on the access assignment data.

According to another general aspect, a method includes collecting, using at least one semiconductor processor, access assignment data characterizing active access assignment operations of a hypervisor in assigning host computing resources among virtual machines for use in execution of the virtual machines. The method further includes calculating, using at least one semiconductor processor, a capacity risk indicator characterizing a capacity risk of the host computing resources with respect to meeting a prospective capacity demand of the virtual machines, based on the access assignment data.

According to another general aspect, a computer program product includes instructions recorded on a non-transitory computer readable storage medium and configured, when executed by at least one semiconductor processor, to cause the at least one semiconductor processor to collect access assignment data characterizing active access assignment operations of a hypervisor in assigning host computing resources among virtual machines for use in execution of the virtual machines. The instructions, when executed by the at least one semiconductor processor, also cause the at least one semiconductor processor to calculate a capacity risk indicator characterizing a capacity risk of the host computing resources with respect to meeting a prospective capacity demand of the virtual machines, based on the access assignment data.

The details of one or more implementations are set forth in the accompa-nying drawings and the description below. Other features will be apparent from the description and drawings, and from the claims.

DETAILED DESCRIPTION

Figure 1:
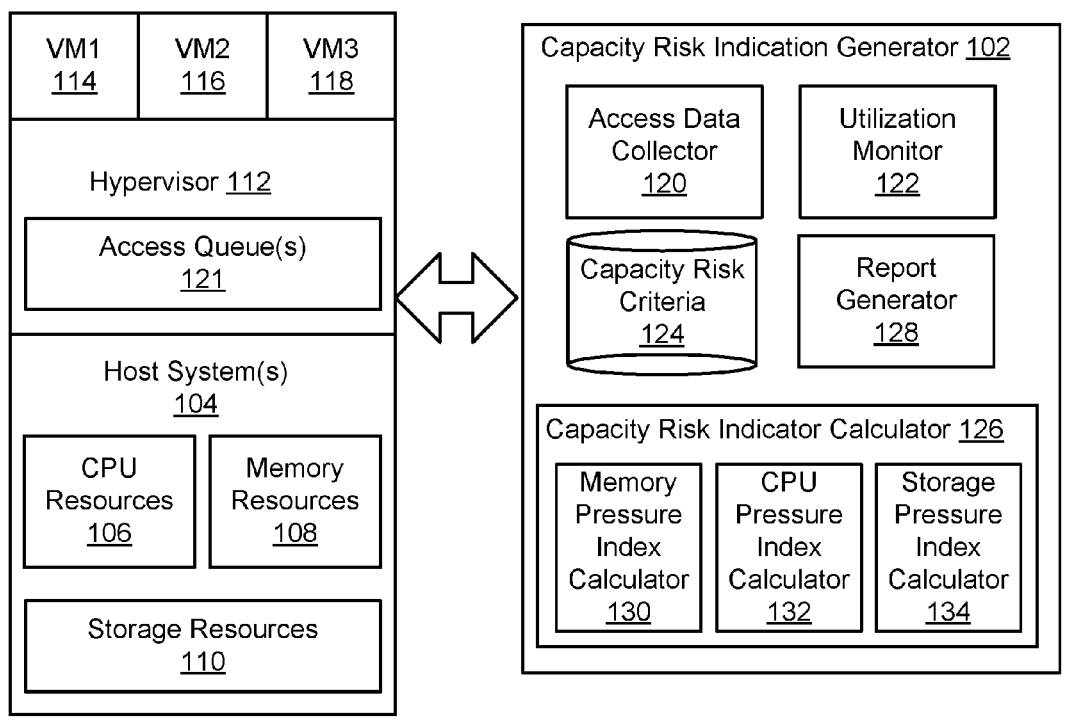
FIG. 1 is a block diagram of a system for capacity risk management for virtual machines.

FIG. 1 is a block diagram of a system 100 for capacity risk management for virtual machines. In the example of FIG. 1, a capacity risk indication generator 102 is configured to provide a capacity risk indicator which provides managers, administrators, or other relevant users of large information technology (IT) infrastructures with information regarding a capacity of the IT infrastructure to execute virtual workloads. As a result, such IT infrastructures running virtual machines may be deployed, managed, and updated in an efficient manner, with minimal inconvenience to users thereof, and with a minimum of technical knowledge required by the manager.

In the example of FIG. 1, a plurality of host systems 104 represent hardware resources which are currently available. As shown, such hardware resources may include CPU resources 106, memory resources 108, and storage resources 110. For example, the CPU resources 106 may refer to one or more processors, the memory resources 108 may include volatile memory used to implement main memory, and the storage resources 110 may represent or include longer term, non-volatile disk-based storage.

Of course, such host systems 104, along with the included hardware resources 106-110, are, by themselves, well known, and are therefore not described herein in further detail, except as may be necessary or helpful in understanding operations of the system 100 of FIG. 1. Moreover, additional or alternative hardware resources should be understood to be potentially included within the host systems 104, so that the illustrated and described hardware resources 106-110 may be understood to represent illustrative and non-limiting examples of hardware resources.

Thus, the host systems 104 may represent, for example, one or more computing devices included within an IT infrastructure. An example deployment and configuration of such host systems 104 is illustrated and described below with respect to FIG. 2. However, more generally, it may be appreciated that many different host system deployments and configurations would be apparent to one of skill in the art.

In operation, the host systems 104, in conjunction with a hypervisor 112, may be utilized to deploy and manage a plurality of virtual machines, illustrated in the example of FIG. 1 as virtual machines 114, 116, 118. That is, the hypervisor 112, which may also be referred to as a virtual machine manager, or virtualization manager, is configured to provide for the deployment of the individual virtual machines 114, 116, 118, and further configured to allocate or assign the hardware resources 106-110 of the host systems 104 among the virtual machines 114-118, in a desired manner.

As referenced above, the virtual machines 114-118 may be deployed in a flexible manner, so as to optimize usage of the hardware resources 106-110 of the host systems 104, relative to service requirements of users of the virtual machines 114-118. For example, each of the virtual machines 114-118 may be assigned to, or associated with, a corresponding consumer of computing resources. In such scenarios, a first user of the virtual machine 114 may have significant requirements with respect to usage of the available hardware resources 106-110 of the host systems 104, while the virtual machines 116, 118 may be associated with a second and third user, respectively, who may have relatively smaller computing requirements. In such scenarios, it may be expected that the user of the first virtual machine 114 may be required to pay significantly higher usage fees with respect to accessing and utilizing the virtual machine 114, as compared to usage fees charged to the users of the virtual machines 116, 118.

Thus, it may be appreciated that, through the use of the hypervisor 112, a manager of the system 100 may be provided with an ability to deploy virtual machines in a desired manner, so as to accomplish associated business goals. For example, as just referenced, the manager of the system 100 may generally allocate the hardware resources 106-110 of the host systems 104 within and among the virtual machines 114-118, in a manner which reflects usage requirements and service level commitments associated with individual, corresponding consumers of the virtual machines 114-118. Along the same lines, over time, the manager of the system 100 may utilize hypervisor 112 to adjust a level of hardware resources 106-110 required by a given user of a given virtual machine. For example, the user of the second virtual machine 116 may desire increased access to the underlying host systems 104. In other examples, a new or existing user may request an entirely new virtual machine, not explicitly illustrated in the example of FIG. 1, which may then need to be deployed and managed using the hypervisor 112.

Over time, then, the host systems 104 may experience a saturation of the available hardware resources 106-110, such as when aggregate computing needs of users of the system 100 with respect to the deployed virtual machines 114-118 can no longer be adequately satisfied using the available hardware resources 106-110. Of course, it may be possible for a manager of the system 100 to take appropriate steps in response to such saturation scenarios. For example, it may be possible for the manager to deploy additional host systems and associated hardware resources, so as to thereby meet an increased demand with respect to required deployments of virtual machines. In other examples, the manager of the system 100 may adjust service level commitments with respect to currently-deployed virtual machines, so as to thereby continue to meet a required service level.

However, it may be difficult for the manager of the system 100 to determine whether, when, how, and to what extent such corrective actions should be taken. For example, the manager may generally be aware of an overall current capacity of the host systems 104 in providing the hardware resources 106-110. Nonetheless, it may difficult for the manager to determine a current level of risk with respect to saturation of that available capacity.

For example, it may be difficult for the manager to determine which host system or group of host systems are most at risk of saturation. Similarly, it may be difficult for the manager, when seeking to deploy the virtual machines, to determine which of the available host systems should be used (or, conversely which should be avoided due to current risk of saturation). Still further, even in situations in which the manager has knowledge of a capacity status of the host systems 104, it may be necessary or desirable for the manager to have an ability to summarize the capacity status in a convenient and easily utilizable format. For example, it may be necessary to provide reports related to the capacity status, e.g., to upper management, so as to justify a recommended reconfiguration, tuning exercise, or purchase of new hardware resources.

Thus, as referenced above, the capacity risk indication generator 102 may be configured to interact with the hypervisor 112 and/or the host systems 104, to thereby determine and provide capacity risk indicators with respect to the deployment and use of the virtual machines 114-118. More particularly, as described in detail below, the capacity risk indication generator 102 may include an access data collector 120, which may be configured to collect access assignment data characterizing active access assignment operations of the hypervisor 112 with respect to assignments of the hardware resources 106-110 among the virtual machines 114-118.

That is, as referenced above, the hypervisor 112 may be configured to allocate or assign access of each of the virtual machines 114-116 to available hardware resources 106-110. For example, with respect to the CPU resources 106, it may occur that the hypervisor 112 has assigned a large percentage of the available CPU resources 106 to the virtual machine 114. In such scenarios, if one or both of the virtual machines 116, 118 require calculations to be performed using a portion of the CPU resources 106, it may be necessary for the virtual machines 116, 118 to wait until computing requirements of the virtual machine 114 have been met, before gaining access to more of the available CPU resources 106.

Meanwhile, if a memory demand of one of the virtual machines, e.g., the virtual machine 116, requires it, then the hypervisor 112 may be configured to temporarily or permanently reassign or reallocate portions of the memory resources 108, in an attempt to meet the demands of the virtual machine 116. Similarly, the hypervisor 112 may manage input/output (I/O) operations with respect to access of the storage resources 110 by the virtual machines 114-118.

In short, when actively assigning the available hardware resources 106-110 within and among the virtual machines 114-118, the hypervisor 112 may be understood to implement a plurality of corresponding access queues 121. That is, the access queues 121 may be understood to represent a plurality of queues, each corresponding to a relevant type of hardware resource.

For example, virtual machines waiting for processing time of the CPU resources 106 may be queued within a corresponding CPU access queue, so that virtual machines are ultimately provided with allocated portions of the CPU resources 106 in a pre-determined manner. Similarly, one or more of the virtual machines 114-118 may be required to wait for available memory pages of the memory resources 108, and, also similarly, the various virtual machines 114-118 may be queued for assignment of access to the storage resources 110.

As illustrated and described, the capacity risk indication generator 102 also may include a utilization monitor 122, which may be configured to monitor a current utilization of the available hardware resources 106-110 by the virtual machines 114-118. For example, the utilization monitor 122 may monitor a total number of memory pages of the memory resources 108 consumed by an individual virtual machine, and/or may monitor a number of memory pages actively being utilized by a particular virtual machine. Similarly, the utilization monitor 122 may monitor a utilization of the storage resources 110, e.g., as a measurement of a percentage of available storage that is currently being utilized, individually or in the aggregate, by the virtual machines 114-118.

In practice, such utilization data collected by the utilization monitor 122 may be useful in assessing a current or potential future saturation risk with respect to the host systems 104. However, in various scenarios, some of which are described below, exclusive reliance on such utilization data may provide a flawed or faulty assessment of saturation risks. For example, such utilization data may provide false positive assessments of saturations risks, such as when the memory resources 108 appear to be highly utilized due to previous consuming of such memory pages by the virtual machines 114-118, when in fact such consumed memory pages are not actively being utilized by at least one or more of the virtual machines 114-118, and are therefore available for temporary or longer term reassignment, as needed, among remaining ones of the virtual machines 114-118. On the other hand, such utilization data also might provide a false negative assessment of saturation risks, such as when a large percentage of the storage resources 110 are currently available, but the associated I/O latencies being experienced in conjunction with actual access of the storage resources 110 are unacceptably high, such as during times of frequent access requests by the virtual machines 114-118 with respect to the storage resources 110.

Therefore, in the example of the capacity risk indication generator 102 of FIG. 1, access assignment data collected by the access data collector 120 may be used, perhaps in conjunction with utilization data collected by the utilization monitor 122, to provide accurate, easily utilizable assessments of a capacity risk with respect to a current or future saturation of the available hardware resources 106-110 of the host systems 104. More particularly, as described in detail below, capacity risk criteria 124 may be utilized, in conjunction with the collected access assignment data and the utilization data, to thereby enable a capacity risk indication calculator 126 to provide the type of accurate, timely capacity risk indicator referenced above. Accordingly, a report generator 128 may be enabled to provide clear, comprehensive, understandable reports with respect to current and potential capacity risk assessments, so that the manager of the system 100 may identify and respond to saturation threats in a timely, efficient, and optimized manner, without requiring the manager to have a detailed understanding of the underlying manner in which the capacity risk was assessed.

Thus, for example, the capacity risk indicator calculator 126 may be configured to provide a measure of saturation of the hardware resources 106-110 of the host systems 104. That is, as referenced above, such saturation generally refers to a condition in which there is not currently enough memory, CPU, or storage space to add new workloads, based on the access assignment data and the utilization data, relative to previously-determined thresholds included within the capacity risk criteria 124 (e.g., a memory threshold, a CPU threshold, or a storage threshold). For example, generally speaking, such thresholds may be provided based on an experience and expertise of an administrator of the system 100 during a configuration process thereof, and/or may be based on a level of availability required. For example, in the latter example, if the host systems 104 represent a cluster of eight hosts, and if the capacity risk criteria 124 specifies that tolerance of at least one host failure is required, then 87.5% of the memory and CPU would be a maximum available capacity before applying relevant thresholds.

In addition to such saturation measures, the capacity risk indicator calculator 126 may provide associated measures of potential or impending saturation. In such scenarios, a sufficient quantity of memory, CPU, or storage space may currently exist, but may be rapidly being depleted, so that, at a current rate of usage, it is possible to predict saturation within a specified, calculated number of days. In such scenarios, the number of days to saturation may differ for individual ones of the hardware resources 106-110.

In addition to, or in conjunction with, such measures of saturation or impending saturation, the capacity risk indicator calculator 126 may be configured to leverage the access assignment data collected by the access data collector 120, in conjunction with the capacity risk criteria 124, to consider interactions between the various virtual machines 114-118. Such interactions, as referenced above, may cause the hypervisor 112 to perform associated overhead work in allocating the hardware resources 106-110 within and among the virtual machines 114-118, which may thus affect the performance and service levels of the existing virtual machines 114-118. In the example of FIG. 1, and as described in detail below, such overhead activity associated with the active allocation or assignment of one or more of the hardware resources 106-110 is referred to herein as "pressure," where such resource pressure is used to provide a dynamic and helpful assessment of current and future saturation risks, to thereby assess what future action (e.g., reconfiguration, tuning, or purchase of new hardware resources) should be taken.

For example, a memory pressure index calculator 130 of the capacity risk indicator calculator 126 may be configured to calculate a degree of memory pressure currently being experienced by the hypervisor 112. For example, as referenced above, the hypervisor 112 may be required to perform certain quantities of overhead activities in assigning the memory resources 108 within and among the virtual machines 114-118. For example, in scenarios in which a particular virtual machine, e.g., the virtual machine 116, has previously been allocated a certain number of memory pages from within the memory resources 108, it may occur that the virtual machine 114 has need for additional quantities of memory pages. In such situations, for example, if the virtual machine 116 is not currently using particular memory pages which were previously consumed or otherwise assigned to the virtual machine 116, then the hypervisor 112 may proceed to temporarily borrow or reassign specific memory pages associated with the virtual machine 116 for use by the virtual machine 114, in a process known as ballooning. Similarly, in such situations, the hypervisor 112 may actually reassign identified memory pages previously consumed by the virtual machine 116, from the virtual machine 116 to the virtual machine 114. Such reassignment of particular memory pages of the memory resources 108 may be referred to as swapping, or hypervisor swapping.

Thus, in order to meet the memory demands of the virtual machines 114-118, as referenced above, the hypervisor 112 may maintain individual ones of the virtual machines 114-118 within a corresponding access queue of the access queues 121. Then, as described, the hypervisor 112 may attempt to meet memory demands of the queued virtual machines through the dynamic memory page assignment activities (e.g., including ballooning and swapping) just referenced.

In many cases, such ballooning and/or swapping operations may be sufficient to allow a hypervisor 112 to meet memory demands of the virtual machines 114-118. For example, as long as only a few such ballooning and/or swapping operations are required within a particular amount of time, the ballooning/swapping strategies may be successful in dynamically and temporarily meeting a specific demand of a specific virtual machine, without disrupting access of remaining virtual machines to the memory resources 108. On the other hand, as a number of such ballooning/swapping operations increase within a given period of time, it becomes difficult for the hypervisor 112 to allocate available memory pages of the memory resources 108 in a manner which shares the memory resources 108 in accordance with applicable service level agreements.

Thus, as described in detail below, the memory pressure index calculator 130 may be configured to quantify a number and/or rate of such ballooning/swapping operations, and other access assignment activities of the hypervisor 112 with respect to the memory resources 108. Thresholds for assessing capacity risk in conjunction with a number or rate of such ballooning/swapping operations may be stored in the context of the capacity risk criteria 124. Then, the memory pressure index calculator 130 may be configured to determine an overall memory pressure currently being experienced by the hypervisor 112.

Similar comments apply to a CPU pressure index calculator 132 of the capacity risk indicator calculator 122. For example, as described in detail below, the CPU pressure index calculator 132 may be configured to consider activity indicators of the hypervisor 112 with respect to assigning access of the virtual machines 114-118 to the CPU resources 106. For example, as also described in detail below, a CPU ready time refers to an amount of time waited by an individual virtual machine before a CPU of the CPU resources 106 is ready to execute a desired calculation or other operation. In other words, high values of CPU ready time generally indicate that processing tasks of individual ones of the virtual machines 114-118 are otherwise ready to run, but are currently delayed within the access queues 121 corresponding to a CPU access queue for processor time on the host systems 104.

Still further, a storage pressure index calculator 134 may be configured to determine, from the access data collector 120 in conjunction with the capacity risk criteria 124, a presence of high I/O latency readings on data stored using the storage resources 110, where such high I/O latency readings indicate a presence of pressure on an I/O stack of the storage resources 110. As may be appreciated, corresponding access of the virtual machines 114-118 to an I/O stack of the storage resources 110 may be managed through the use of a corresponding access queue of the access queues 121. Again, definitions of quantities of latency readings considered to be high, along with a representation of a number of high readings required to constitute a risk, may be understood to represent parameters stored within the capacity risk criteria 124, and having values configured by an authorized administrator of the system 100.

Additional discussion of the capacity risk indicator calculator 126, including the pressure index calculators 130, 132, 134, is provided in detail below. With respect to FIG. 1, however, it may be appreciated that the capacity risk indication generator 102 is illustrated as being separate from, and in communication with, the hypervisor 112. Nonetheless, it may be appreciated that such illustration is intended to provide a simplified representation of example implementations of the system 100. In practice, the capacity risk indication generator 102 may be implemented, for example, as part of the hypervisor 112.

Also, it may be appreciated that the capacity risk indication generator 102, however implemented, may utilize a portion of the available hardware resources 106-110, in order to provide the various features and functions described above. For example, the memory resources 108 and/or the storage resources 110 may be understood to represent an appropriate non-transitory computer readable storage medium, for storage thereon of instructions and/or data used to implement the capacity risk indication generator 102. Similarly, the CPU resources 106, which may include at least one semiconductor processor, may be leveraged to execute such instructions, and thereby provide the capacity risk indication generator 102.

In practice, the various pressure index calculations of the capacity risk indicator calculator 126 may be used individually or in the aggregate to assess a current capacity risk within the system 100. For example, any one of the memory pressure, the CPU pressure, or the storage pressure may be quantified and considered for implication with respect to capacity risk management. In specific implementations, the capacity risk indicator calculator 126 may be configured to aggregate or otherwise combine the pressure index calculations of the pressure index calculators 130, 132, 134. For example, as described in detail below with respect to FIG. 5, each of the memory pressure, the CPU pressure, and the storage pressure may be assigned a weight, and the weighted pressures may then be aggregated to determine an overall level of pressure existing within the system 100.

Figure 2:
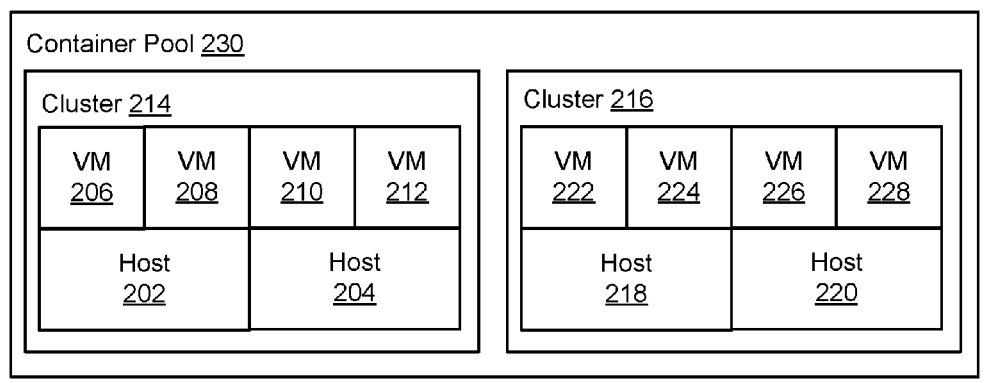
FIG. 2 is a block diagram of an example infrastructure that may be managed using the system of FIG. 1.

In the simplified example of FIG. 1, as described above, the host systems 104 are illustrated as one or more individual host systems, each of which may be associated with its own hardware (e.g., CPU, memory, storage) resources. However, as also referenced above, in various implementations, many different configurations of such host systems are possible. For example, as shown in FIG. 2, an individual host 202 may be utilized to host virtual machines 206, 208, while a host 204 is configured to host virtual machines 210, 212. The pair of hosts 202, 204 may be defined as a cluster 214.

Similarly, the host 218 may host virtual machines 222, 224, while another host 220 hosts virtual machines 226, 228. Then, as shown, the host 218, 220 may also be defined as being included within a cluster 216. Finally in the example of FIG. 2, the clusters 214, 216 may be included within a container pool 230. Of course, FIG. 2 is a simplified example, and in actual implementations, in general, virtual machines are assigned to clusters, not individual hosts. That is, virtual machines are assigned to clusters, and can be migrated between individual hosts, depending on resource availability.

With respect to operations of the system 100 as described above, it may be appreciated that the capacity risk indication generator 102 is capable of providing capacity risk assessments and other indicators with respect to desired levels of the types of IT infrastructure referenced and illustrated with respect to FIG. 2. For example, such capacity risk indicators may be provided with respect to individual ones of the hosts 202, 204, 218, 220. In other example implementations, calculations may be performed, and capacity risk indications may be provided, with respect to individual ones of the clusters 214, 216.

Similarly, capacity risk assessment may be made at a level of the container pool 230, relative to other container pools, not explicitly illustrated, within a larger IT infrastructure. For example, the capacity risk indication generator 102 may determine that the cluster 214 is the cluster most likely to experience saturation during an upcoming week. In other examples, it may be determined that the host 218 is currently saturated, while the host 220 has the capability to host an additional, newly-deployed virtual machine. For example, if one or more of the pressure index calculators 130, 132, 134 determine an unacceptable level of a corresponding resource pressure, then the capacity risk indicator calculator 126 may assign numeric values to the calculated pressures, based on severity, and, as referenced above, the resulting numeric values may be combined or otherwise aggregated, e.g., using weights assigned to each pressure calculated.

Then, if such conditions are detected on more than one host within a cluster, the resulting numeric value may be combined, to thereby allow the report generator 128 to easily summarize a likelihood of the cluster in question being at risk of saturation (e.g., a likelihood may be represented as a single number between 0-100). Further, the report generator 128 may be provided with individual components used to compute the just-referenced number representing the risk of saturation. Further, English language explanations, describing in words what the individual components mean, may be generated by the report generator 128, along with a description of what investigation might be useful in determining how to alleviate the relevant types of resource pressure, or otherwise deal with the possibility of a current or future saturation.

In these or other example implementations, the capacity risk indicator calculator 126 may utilize utilization data provided by the utilization monitor 122, in order, for example, to provide an initial assessment of capacity risk. Then, the various pressure calculations of the pressure index calculators 130, 132, 134 may be utilized in conjunction with the utilization data to provide an overall capacity assessment.

For example, it may be appreciated that the various pressure calculations represent the idea that each such pressure metric is associated with an additional reason that is a source of saturation risk for a corresponding one of the three described hardware resources. In other words, for example, as described in detail below with respect to FIG. 5, utilization data provided by the utilization monitor 122 may be utilized to provide an initial starting point for capacity risk assessment, and the various types of resource pressure calculated by the capacity risk indicator calculator 126 may then be used to adjust the capacity risk indication determined in conjunction with corresponding utilization data provided by the utilization monitor 122.

In other words, the hardware pressure metrics generally indicate some additional source, or mitigating aspect, of capacity risk in addition to capacity risk calculated in conjunction with the utilization data. In this regard, the pressure metric(s) may be considered to be supplemental calculations with respect to capacity risk assessments calculated using the utilization data of the utilization monitor 122.

Figure 3:
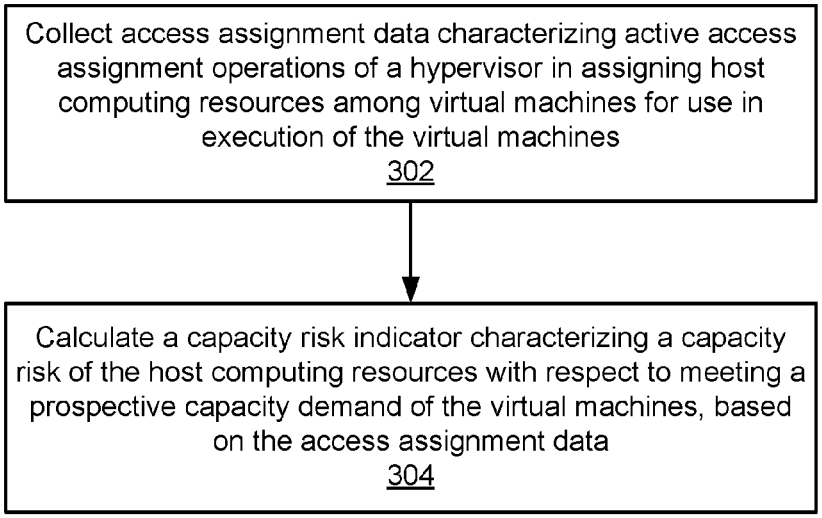
FIG. 3 is a flowchart illustrating example operations of the system of FIG. 1.

FIG. 3 is a flowchart illustrating example operations of the system 100 of FIG. 1. In the example of FIG. 3, operations 302-304 are illustrated as separate, sequential operations. However, it may be appreciated that various additional or alternative operations may be included, and, in various implementations, all such operations may be executed in an iterative, looped, branched, nested, or parallel fashion.

In the example of FIG. 3, access assignment data characterizing the active access assignment operations of a hypervisor in assigning host computing resources among virtual machines for use in execution of the virtual machines may be collected (302). For example, the access data collector 120, as described above, may be configured to collect access assignment data characterizing the active access assignment operations of the hypervisor 112 in assigning the various hardware resources 106, 108, 110 among the example virtual machines 114, 116, 118.

A capacity risk indicator characterizing a capacity risk of the host computing resources with respect to meeting a prospective capacity demand of the virtual machines may be calculated, based on the access assignment data (304). For example, the capacity risk indicator calculator 126 may be configured to calculate the memory pressure index, the CPU pressure index, and the storage pressure index, as described above.

As just referenced, FIG. 3 represents a simplified representation of example operations of the system 100, and, in various implementations, many additional or alternative operations may be included. Further, of course, many more detailed aspects of the operations 302, 304 should be considered to be within the scope of the operations 302, 304.

For example, as described, the various pressure calculations for the hardware resources 106, 108, 110 may be utilized in conjunction with utilization characteristics thereof, as determined using the utilization monitor 122. Further, many specific, appropriate techniques may be utilized to calculate each individual hardware resource pressure value, and, similarly, various techniques may be utilized to combine some or all of the hardware resource pressure values, perhaps in conjunction with utilization metrics, in order to obtain a final capacity risk indicator value.

More specifically, for example, specific calculation techniques might consider a type of operating system being used by the host systems 104, or other platform characteristics thereof. Also, as described in detail below with respect to FIG. 5, specific, appropriate values may be selected for the various calculations of the capacity risk indicator calculator 126. For example, various thresholds may be configured and utilized in the context of calculating values for hardware resource pressure experienced by each of the CPU resources 106, the memory resources 108, and the storage resources 110.

Further, as described above with respect to FIG. 2, the example of the system 100 of FIG. 1 should be understood to represent a simplified example of the types of IT infrastructure that might benefit from use of the capacity risk indication generator 102. In example infrastructures such as those described and illustrated above with respect to FIG. 2, it may be appreciated that the system 100 enables highly flexible, customizable capacity risk indicators for the types of IT infrastructures represented by the example of FIG. 2. For example, a capacity risk indicator may be computed for an individual host, or for a cluster 214, 216. That is, a capacity risk indicator for, e.g., the cluster 214, may be determined based on capacity risk indicators for each of the included hosts 202, 204. Similarly, a summary risk indicator for the container pool 230 may be calculated using capacity risk indication values for each of the clusters 214, 216. Along with each such summary capacity risk indicator, information regarding each underlying resource, and each component or reason associated therewith and utilized in the calculation of the corresponding capacity risk indicator, may be provided (e.g., by the report generator 128).

Figure 4:
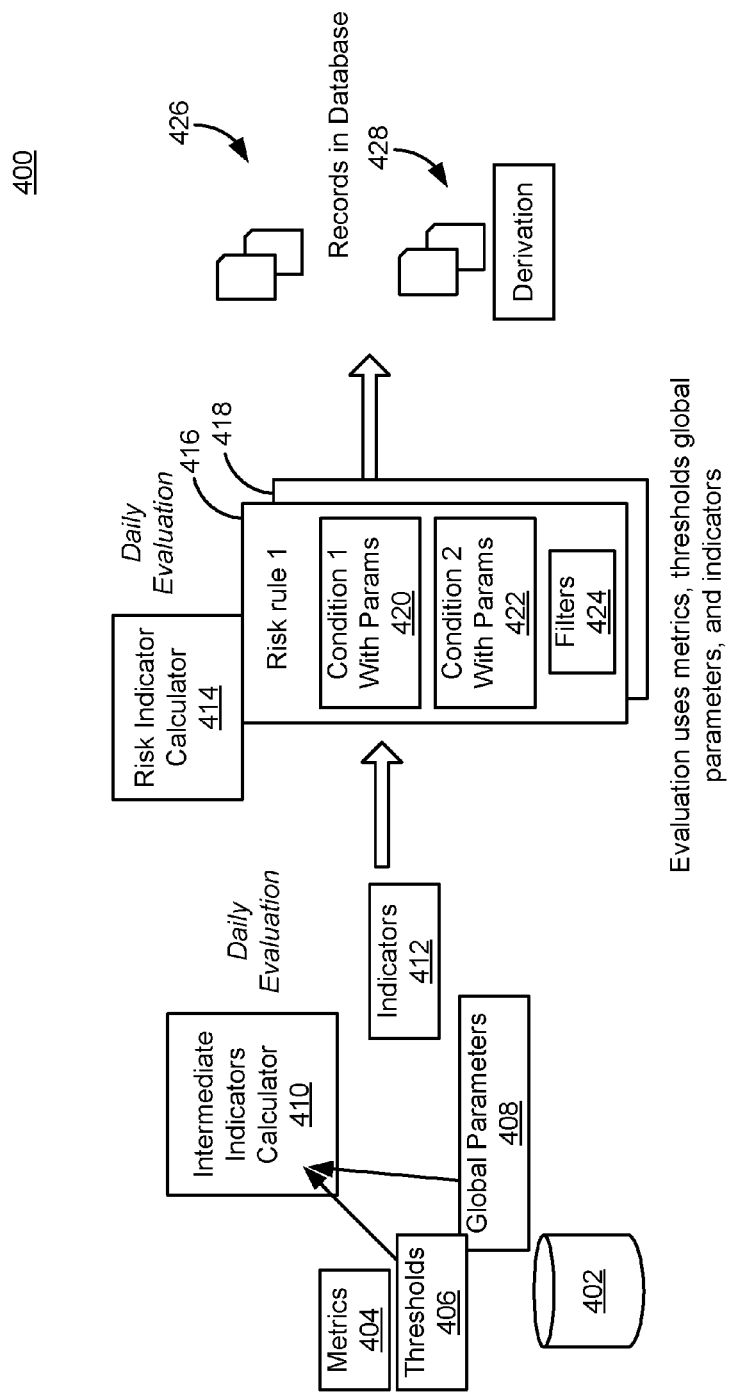
FIG. 4 is a block diagram illustrating an example data flow of data collection and processing that may be performed by the system of FIG. 1.

FIG. 4 is a block diagram illustrating a process flow of example calculations performed by the system 100 of FIG. 1. In the example of FIG. 4, repository 402 represents storage for metrics 404, thresholds 406, and global parameters 408.

In general, the metrics 404 refer to quantities that are imported directly from a relevant data source, which might also be referred to as measured or raw metric, and which thus serves as initial input values. The thresholds 406 are defined to specify acceptable operating ranges for corresponding metric. For example, a given threshold might define a minimum and/or maximum value for a corresponding metric of the metrics 404.

Global parameters 408 refer generally to any additional parameters that might be utilized during calculation of a given pressure index, e.g., the memory pressure index, the CPU pressure index, or the storage pressure index. By externalizing such global parameters, associated calculations for the various hardware resource pressure values may be adjusted as needed, e.g., may be adjusted based on a service level and/or tolerance of each user environment.

Thus, with reference to FIG. 1, the repository 402 may be understood to at least partially represent, or include, the capacity risk criteria 124. For example, the various thresholds 406 may be stored, perhaps in conjunction with the global parameters 408, within the capacity risk criteria 124. Meanwhile, the metrics 404 may be collected by the access data collector 120 and/or the utilization monitor 122, and may be stored by the capacity risk indication generator 102, perhaps in conjunction with the capacity risk criteria 124, or using any appropriate storage techniques.

Further in FIG. 4, an intermediate indicator calculator 410 may be utilized to process the metrics 404, in conjunction with the thresholds 406 and the global parameters 408, in order to obtain intermediate indicators 412. That is, the indicators 412 may be understood to be derived from the metrics 404. A risk indicator calculator 414 may then be utilized to implement various risk rules 416, 418. For example, as shown, a first risk rule 416 may include a first parameterized condition 420, a second parameterized condition 422, and associated filters 424. Thus, as illustrated, the risk rule 416 is composed of the conditions 420, 422. The rule 416 represents the complete logic for the final risk indicator calculations, in accordance with a derivation 428, to thereby provide capacity risk indicators within database records 426.

Figure 5:
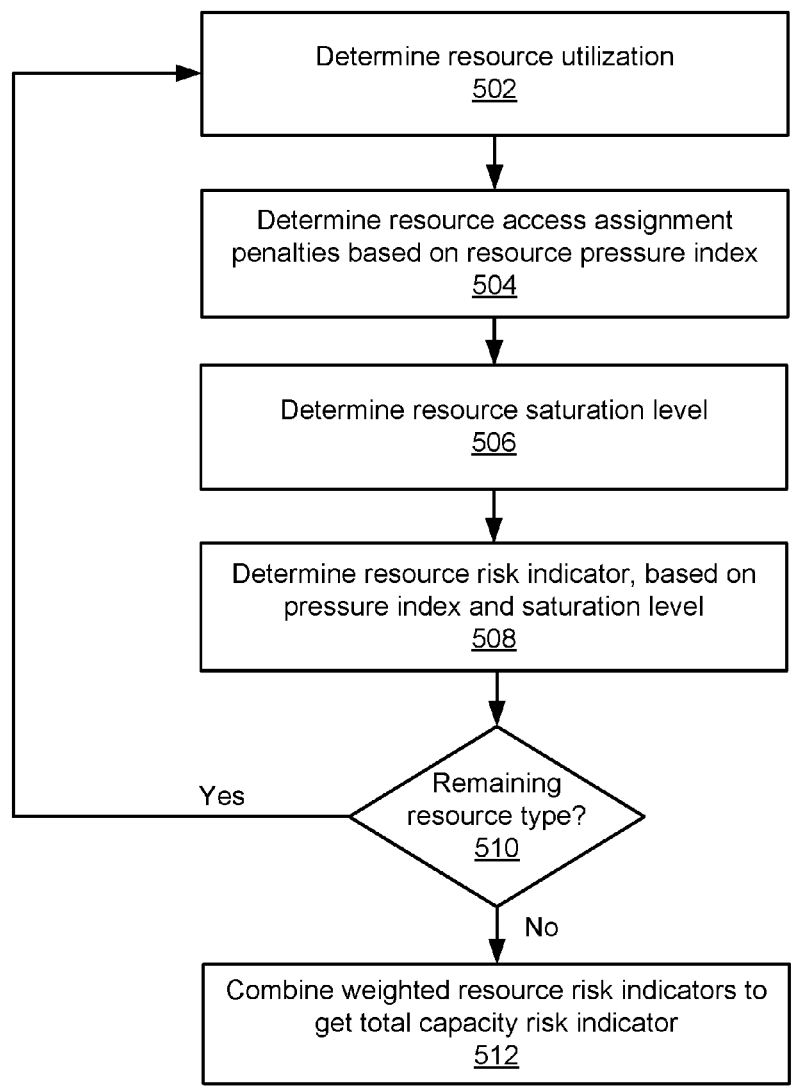
FIG. 5 is a flowchart illustrating more detailed example operations of the system of FIG. 1.

Specific operations and examples of aspects of FIG. 4 may be understood and appreciated from the following description of FIG. 5, and associated example calculations. In particular, FIG. 5 is a flowchart 500 illustrating detailed example operations of the systems of FIGS. 1 and 4.

In the example of FIG. 5, a resource utilization level for a first hardware resource may be determined (502). For example, the utilization monitor 122 may determine a utilization level of the memory resources 108. More specifically, as described in detail below, specific memory utilization metrics, such as consumed memory metric and active memory metric, may be collected.

Resource access assignment penalties may be determined, based on a corresponding resource pressure index for the current hardware resource, e.g., for the memory resources 108 (504). That is, as referenced above, in the example of FIG. 5, the relevant resource pressure index, e.g., the memory pressure index, may be utilized as a potential adjustment, or penalty, to be used in conjunction with the previously-collected resource utilization metrics, in order to provide a more accurate and meaningful representation of capacity risks associated with the hardware resource in question.

Then, a resource saturation level may be determined (506). For example, with respect to the memory resources 108, saturation levels might refer generally to characterizations of how close the memory resources 108 are to being insufficient or unsatisfactory with respect to current or future demands of the virtual machines 114, 116, 118, or additional virtual machines to be assigned. Thus, such saturation levels might include projections or predictions of a quantity of time remaining before dangerous saturation levels are reached, based on a historical analysis, in order to provide an estimate of time remaining until a saturation of a given host, cluster, or container pool occurs for the hardware resource in question. Techniques for calculating saturation levels, including techniques for using historical analysis to create a prediction or projection of time remaining until dangerous saturation levels occur, would be known to one of skill in the art. For example, as referenced above, existing capacity risk management systems which utilize the types of utilization metrics collected by the utilization monitor 122 have developed specific techniques for analyzing usage history of the hardware resource in question, along with various other parameters, in order to predict a time remaining until saturation of the hardware resource in question.

Nonetheless, it may be appreciated from the above discussion that such known techniques for calculating saturation levels will only be as good as the underlying, available data characterizing the hardware resource in question. In the example of FIG. 5, as described herein, the various hardware resource pressure indicators may be utilized to provide more accurate and more representative data for use by existing or future techniques for calculating and predicting future saturation levels.

Then, a resource risk indicator may be determined, based on the determined pressure index value and saturation level value (508). In other words, an individual resource risk indicator for the hardware resource being analyzed may be determined (508).

If remaining resource type(s) exist (510), then the above-described operations 502-508 may continue with respect to a subsequent hardware resource type. For example, in a second iteration, similar calculations may be performed with respect to the CPU resources 106. Then, in a third and final iteration of the example of FIG. 5, similar calculations may be performed with respect to the storage resources 110.

When no hardware resource remain (510), then the previously-calculated risk indicators may each be weighted in a desired manner, and combined to obtain a total capacity risk indicator (512). That is, as described in detail with respect to the example below, the resource risk indicator for each of the CPU resources 106, the memory resources 108, and the storage resources 110 may be weighted and combined, in order to get an aggregated, total capacity risk indicator value (512).

Thus, as may be appreciated from the above description, a capacity risk indicator value may be computed using a combination of days to saturation and associated pressure index for each associated hardware resource. In the following examples, each such pressure index may be computed using sliding scale points for utilization/capacity metrics, in conjunction with a penalty for metrics that breach specific, predefined thresholds.

The following equations illustrate an example of the above-described techniques. As may be observed, a first part, part A, may be calculated based on a combination of days to saturation for the CPU resources 106, along with a CPU pressure index value (CPI). As also shown, a weight for CPU resources 106 also may be included in part A. Then, similar comments apply to part B, with respect to the memory resources 108. Further, similar comments would apply to part C and with respect to the storage resources 110. Then, as shown, the total capacity risk value score may be aggregated simply as part A+part B+part C, as shown in Equation. 1:

Part $A=(((30\text{-DAYS\_TO\_SATURATION[CPU]})*100/30+CPI)/2)*\text{CPU\_WEIGHT}$ Part $B=(((30\text{-DAYS\_TO\_SATURATION[MEM]})*100/30+MPI)/2)*\text{MEM\_WEIGHT}$ Part $C=(((30\text{-DAYS\_TO\_SATURATION[STO]})*100/30+SPI)/2)*\text{STO\_WEIGHT}$ Total Score=Part $A$+Part $B$+Part $C$  Equation 1

By way of specific example with respect to the memory pressure index (MPI), various metrics may be utilized. For example, an "active memory" of the memory resources 108 with respect to the virtual machines 114, 116, 118, refers to memory pages that have been assigned to a specific virtual machine, and that are currently or recently being utilized by the virtual machine in question. Meanwhile, "consumed memory" refers to memory pages that have been assigned to a specific virtual machine, but that may include memory pages that have not been actually utilized by the virtual machine in question for some predetermined amount of time. As described in detail below, a ratio of consumed to active memory may be utilized in conjunction with calculation of a value for the memory pressure index.

Meanwhile, memory over commitment refers to a metric associated with a hypervisor feature that allows a particular virtual machine to use more memory space than the underlying physical host has available. For example, it may occur that a total quantity of the memory resources 108 might be 5 GB, but that each virtual machine 114, 116, 118 might be assigned two or more GB of memory. The concept of the over commitment metric is that most virtual machines may use only a fraction of allocated physical memory, so that it is reasonable to think that available memory resources 108 may be shared among the virtual machines 114, 116, 118 in a suitable manner.

Thus, as referenced above, and described in detail below, such utilization metrics as consumed memory, active memory, and memory over commitment, may be determined by the utilization monitor 122, and may be useful, in conjunction with a memory pressure index value, in ultimately computing an accurate capacity risk indicator value. Nonetheless, such utilization metrics, by themselves, may be unsuitable in providing an accurate assessment of capacity risk. For example, the consumed memory metric may give an inflated picture of actual memory usage, since, as referenced, some memory pages may have been defined some time ago, without being currently used. Meanwhile, the active memory metric may give a deflated view of actual memory usage.

Then, in order to calculate the memory pressure index, e.g., using a memory pressure index calculator 130, a memory pressure index value may be calculated within a range of 0-100, where higher numbers correspond with higher memory pressure. In the following example, a minimum value of memory pressure may be assigned as being equal to a measure of the active memory utilization metric. Then, penalty points may be assigned to increase the value of the memory pressure index above the minimum value defined as the active memory utilization.

For example, such penalty points may be assessed with respect to analysis of a ratio of consumed memory to active memory, or with respect to memory over commitment. Moreover, penalty points for the memory pressure index may be calculated based on measurements of ballooning and swapping being executed by the hypervisor 112, as examples of active access allocations being made by the hypervisor 112.

In the following examples, including with respect to the CPU pressure index and the storage pressure index, as well as the memory pressure index, various thresholds, such as the thresholds 406 of FIG. 4, may be utilized to determine and characterize a presence and extent of indicators associated with the corresponding pressure calculation. However, specific types of thresholds may be more suitable in the context of various ones of the CPU pressure index, the memory pressure index, and the storage index. Moreover, specific values for such thresholds may also be configured, based on, e.g., the underlying host system 104.

Further, it is possible to provide two levels of such threshold for each associated metric or indicator. For example, two levels of thresholds (low and high threshold values) may be utilized to define acceptable, risky, or unpermitted states or values of associated metric or indicators. When using such low/high ranges, the system 100 may easily associate green, yellow, and red with values that are below, between, or above, respectively, the low/high thresholds. Nonetheless, for purposes of determining a relevant hardware resource pressure index, generally only a high value for a given threshold need be defined and/or utilized.

Further, it may be appreciated that some metrics, when acting in a manner associated with potential saturation or other capacity risk, may be likely to have a sustained value above a relevant threshold. In other examples, some metrics may be likely to have short spikes above an associated threshold value, without having a sustained high value. In the former examples, thresholds may be characterized in terms of an extent of time that a metrics value is sustained above threshold. On the other hand, in the latter scenarios, a number of times that a metric exceeds a high threshold within a certain time period may be counted. By counting such short spikes above a relevant high threshold value, meaningful characterizations of threshold violations may be determined. For example, for a specific high threshold, a short violation thereof that occurs once within a relatively long time period may not present any cause for concern. On the other hand, a high count of such threshold violations within a defined time period may be unacceptable.

Returning to the memory pressure index (MPI) calculation, a first part of the calculation may include a characterization of the consumed to active memory ratio. In the specific example, a configurable threshold of 6 may be selected, where a minimum penalty=5 and a maximum penalty=10. Then, if the consumed to active ratio is greater than or equal to 2 times the configured threshold, the resulting penalty would be 2 times the minimum penalty. On the other hand, if the consumed to active ratio is greater than 1 times the threshold, but not greater than or equal to 2 times the threshold, then the penalty assessed may be defined as the maximum penalty.

In a second part of the MPI calculation, ballooning may be considered. As referenced above, ballooning is a known memory management technique, which involves borrowing of memory pages from one virtual machine, in order to meet a memory demand of another virtual machine. For this calculation, a threshold of 1 GB may be configured, whereupon as referenced above, a violation of the threshold may be considered to be an instance in which values for ballooning activities by the hypervisor 112 exceed a defined threshold for a certain number of times and within a defined time window.

Thus, in the example where the threshold is 1 GB, a minimum penalty may be set to a value of 5, while a maximum penalty may be set to a value of 15. Then, if the value for ballooning activities of the hypervisor 112, as collected by the access data collector 120 is greater than or equal to the threshold, then the penalty assigned may be equivalent to the minimum penalty, i.e., 5. On the other hand, if the ballooning activities are greater than or equal to 2 times the threshold, but not equal to 3 times the threshold, then the assigned penalty may be valued as 2 times the minimum penalty, i.e., a value of 10. Finally, if the ballooning activities are greater than or equal to 3 times the threshold, then the penalty may be assigned as the maximum penalty of 3 times the minimum penalty, or 15.

In a third part of the MPI calculation, an over commitment threshold may be set to 1.2, where the over commitment threshold may be understood to represent a sustained extent to which memory over commitment exists. In the example, the configurable threshold is set at 1.2.

Then, a minimum penalty may be set to 5, while a maximum penalty may be set to 15. In assessing penalties, if the over commitment value is greater than or equal to the threshold, then the penalty may be assigned as the minimum penalty. If the over commitment value is greater than or equal to the threshold+0.2, then the penalty may be assessed as 2 times the minimum penalty, or 10. Then, if the over commitment value is greater than or equal to the threshold+0.4, then the penalty may be assessed as 3 times the minimum penalty, i.e., 3 times 5=15.

In a fourth and final aspect of the calculation of the MPI, a value for swapping or swapping rate of the hypervisor 112 may be determined. Then, a configurable threshold may be defined with respect to a number of times that swapping by the hypervisor 112 occurs within a defined time period. For example, a high threshold of 64 megabits per second may be defined.

Then, if the swap rate is greater than or equal to the threshold, then a minimum penalty of 5 may be assessed. If the swap rate is above 1 but is not greater than or equal to 2, then 2 times the minimum penalty may be assessed. Similarly, for swap rates between 3 and 4, a penalty of 3 times the minimum penalty may be assessed. Between swap rates of 4 and 5 times the threshold, a penalty of 4 times the minimum penalty may be assessed. For swap rates greater than or equal to 5 times the threshold, but less than 6 times the threshold, a penalty of 5 times the minimum penalty may be assessed. Finally, for swap rates greater than or equal to 6 times the threshold, a penalty of 6 times the minimum penalty, or 6 times 5=30, may be assessed.

In order to finally determine a total value for the MPI, an estimated value EST MPI may initially be calculated. For example, if the second part of the memory pressure index calculation described above with respect to ballooning activities is 0, then the Estimated MPI EST MPI may be set equal to an active memory utilization plus the penalty calculated for the first part of the MPI calculation (i.e., the consumed to active memory ratio), plus the penalty assigned to part 3 of the MPI calculation (i.e., over commitment), plus the penalty assessed in the fourth part of the MPI calculation (i.e., the swap rate).

On the other hand, if the balloon rate determined in the second part of the MPI calculation referenced above is nonzero, than an estimated MPI EST MPI may be defined as equal to the active memory utilization plus the second part of the calculation (i.e., the ballooning rate), plus the third part of the calculation (i.e., the over commitment value), plus the penalty assessed for the fourth part of the MPI calculation (i.e., the swapping rate).

Then, the final, actual MPI may be calculated as the minimum value of consumed memory utilization and the EST MPI just calculated. That is, actual MPI=MIN (consumed memory utilization, EST MPI).

For calculation of the CPU pressure index (CPI), as with the memory pressure index, possible values may range from 0-100, with higher numbers indicating higher CPU pressure. In the example, a minimum value of CPU pressure may be set to be equivalent to a measured CPU utilization level, obtained from the utilization monitor 122.

The CPU pressure index may be computed for an individual host, as well as for each cluster. Then, penalty points may be added to the CPU pressure index for excessive instances of high CPU ready time being detected by the access data collector 120.

That is, as described above, CPU ready time refers to a quantity of time that a given virtual machine is required to wait before being granted access to the CPU resources 106. In other words, as also described above with respect to FIG. 1, the virtual machines 114, 116, 118 may be understood to be referenced within the access queues 121, i.e., may be queued to wait for access to the CPU resources 106. Then, an amount of time spent by a given VM within the access queues 121 corresponds to the CPU ready time.

CPU ready time for a given host may be calculated with respect to an average wait of the VMs within the access queues 121. Similarly, a CPU ready time for a given cluster may be computed as an average of CPU ready times of all the virtual machines within the cluster that exceed the CPU ready threshold. In another characterization of CPU ready time, a count may be made of a number of virtual machines within a host or a cluster that exceeds the threshold within a given time period.

For example, for determining a cluster CPU ready time, as just referenced, an average of CPU ready times the virtual machines that exceed the CPU ready threshold may be computed. In the example, the configurable threshold may be set to a value of 10%. For example, if 10% of the virtual machines in the access queues 121 associated with a given cluster meet or exceed a defined acceptable wait time, then the cluster CPU ready time threshold will be considered to have been met.

In a specific example, then, a minimum penalty for exceeding the threshold may be set to a value of 5, while a maximum penalty may be set to a value of 20. Then, if the CPU ready time is greater than or equal to the threshold, but less than 2 times the threshold, then the minimum penalty may be applied. If the CPU ready time is greater than or equal to 2 times the threshold, but less than 3 times the threshold, then a penalty of 2 times the minimum penalty may be applied. Similarly, if the CPU ready time is greater than or equal to 3 times the threshold, but less than 4 times the threshold, then a penalty of 3 times the minimum penalty may be applied. Finally, if the CPU ready time is greater than or equal to 4 times the threshold, then a penalty of 4 times the minimum penalty may be applied (i.e., the maximum penalty).

In a second part of the calculation of the CPU pressure index, a CPU ready exceed count for a cluster may be defined as a number of virtual machines within the cluster that exceed a configurable threshold. For example, the configurable threshold may be set to 10. A minimum penalty for exceeding the threshold may be set to a value of 5, while a maximum penalty may be set to a value of 20.

Then, in the example, and as just described with respect to the first part of the CPU pressure index calculation, a CPU ready exceed count which is greater than or equal to the threshold may be assigned a minimum penalty. A count that is greater than or equal to 2 times the threshold, but less than 3 times the threshold, may be assigned a penalty of 2 times the minimum penalty. A count that is greater than or equal to 3 times the threshold, but less than 4 times the threshold may be assigned a penalty of 3 times the minimum penalty. Finally, a count that is greater than or equal to 4 times the threshold may be assigned a penalty that is equal to 4 times the minimum penalty, i.e., the maximum penalty of 20.

Then, for a final assembly of a final value of the CPU pressure index, if the CPU utilization measure is greater than a CPU utilization threshold, then the CPU pressure index may simply be set to the value of the CPU utilization measure. Otherwise, the CPU pressure index may be calculated as a combination of the CPU utilization measure added to a maximum value of the two parts of the CPU pressure index calculation described above, i.e., the first part being the cluster CPU ready time, and the second part being the cluster CPU ready exceed count.

For the storage pressure index, as with the memory pressure index and the CPU pressure index, a range of possible values may include values from 0-100. Again as with the memory pressure index and the CPU pressure index, higher numbers within this range correlate to higher quantities of pressure.

A minimum possible value of storage pressure may be set to be equal to a storage utilization value obtained by the utilization monitor 122. Storage pressure index values may be computed for individual hosts, clusters, or container pools, and in association with data stores contained therein.

In the context of the storage pressure index, penalty points may be assigned for high input/output (I/O) latency time(s). Then, in a first part of a storage pressure index calculation, a cluster I/O latency may be defined as an average of I/O latencies of data stores that exceed an I/O latency threshold.

For example, a configurable value for the I/O latency threshold may be defined as 30 ms. A minimum penalty may be set at a value of 5, while a maximum penalty may be set at a value of 20. Then, if measured latency is greater than or equal to the threshold, but less than 2 times the threshold, then the penalty may be assigned as the minimum penalty. If the latency is greater than or equal to 2 times the threshold, but less than 3 times the threshold, then the penalty may be assigned as 2 times the minimum penalty. If the latency is greater than or equal to 3 times the threshold, but less than 4 times the threshold, then the penalty may be set at a value equivalent to 3 times the minimum penalty. Finally in the example, if the latency is greater than or equal to 4 times the threshold, then the penalty may be set at 4 times the minimum penalty, i.e., the maximum penalty of 20.

In a second part of the storage pressure index calculation, a cluster I/O latency exceed count may be defined as a number of data stores that exceed a count threshold. For example, the configurable count threshold may be set to a value of 10.

In the example, as above, a minimum penalty may be set to have a value of 5, while a maximum penalty may be set to a value of 20. Then, as just described, if the measured count is greater than or equal to the threshold, but less than 2 times the threshold, then the penalty may be assigned as the minimum penalty. If the latency is greater than or equal to 2 times the threshold, but less than 3 times the threshold, then the penalty may be assigned as 2 times the minimum penalty. If the latency is greater than or equal to 3 times the threshold, but less than 4 times the threshold, then the penalty may be set at a value equivalent to 3 times the minimum penalty. Finally in the example, if the latency is greater than or equal to 4 times the threshold, then the penalty may be set at 4 times the minimum penalty, i.e., the maximum penalty of 20.

Once the first and second parts of the storage pressure index calculation just described have been calculated, the total value for the storage pressure index may be assembled. For example, if the storage utilization value is greater than a storage utilization threshold, then the storage pressure index may be set to be the storage utilization value itself. Otherwise, the storage pressure index may be defined as being equivalent to the storage utilization value plus a maximum value (i.e., a larger penalty) of the first part and the second part of the storage pressure index calculation.

Of course, the preceding example is intended merely as a use case to provide specific example numeric values and ranges, to assist in understanding the operations of FIG. 5. Consequently, as referenced above, many different implementations of FIG. 5 are possible, depending on such factors as the virtualization platform, and individual tolerances and preferences of a given IT administrator.

In such scenarios, the system 100 of FIG. 1 provides an enhanced and improved technique for determining capacity risk indications, by relying on the memory pressure, CPU pressure, and storage pressure indicators, which are determined using metrics indicating potential additional areas of risk. Consequently, the system 100 of FIG. 1 may be enabled to identify additional risks, not found by conventional methods. Moreover, the system 100 of FIG. 1 is capable of producing a more comprehensive summary indicator of the capacity risk of a large number of clusters in automated fashion, thereby minimizing or eliminating manual work for an IT administrator in charge of capacity management.

Specifically, for example, the system 100 of FIG. 1 may be enabled to suppress or avoid false positives experienced by conventional systems. For example, as referenced above, for some resources, e.g., memory, a high utilization value is often normal. Although users may adjust threshold values of utilization metrics, conventional methods may nonetheless produce an excess number of false positives, i.e., may indicate a high capacity risk, when in fact sufficient capacity is available. In contrast, the system 100 of FIG. 1, by incorporating the various hardware resource pressure indicators, identifies capacity risks more accurately and more reliably, and thereby allows utilization thresholds to be set very high, to thereby catch only the truly abnormal or potentially problematic high-utilization conditions.

In other contexts, the system 100 of FIG. 1 may be relatively more sensitive than conventional methods, and may thereby, for example, avoid false negatives. For example, for storage resources, a low utilization may provide a user with a false sense of security, when in fact the I/O capacity of the storage resources in question may be in a critical state. With the system 100 of FIG. 1, which includes disk latency metrics, more potentially problematic capacity risk indications may be provided and identified, which may be more likely to be missed or misidentified using conventional techniques.

In specific implementations, the system 100 may take into account many specific metrics, including historic data, for a combination thereof into a useful numeric value. For example, to rank each of a plurality of clusters by capacity risk. Moreover, the system 100 of FIG. 1 may be enabled to provide reasons behind such ranking, so that a user of the system 100 may drill down and understand which hardware resources are saturating, or likely to saturate, and when such saturation has or may occur. As a result, IT administrators may be enabled to configure IT infrastructures for which they are responsible in a manner which accurately assess and manages capacity risk. As a result, such IT infrastructure managers may experience optimized use of available resources, while a consumer of such resources is provided with a desired reliable, available virtual machine platform.

Implementations of the various techniques described herein may be implemented in digital electronic circuitry, or in computer hardware, firmware, software, or in combinations of them. Implementations may implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system including instructions stored on a non-transitory computer-readable storage medium and executable by at least one processor, the system comprising:
   a data collector configured to cause the at least one processor to, collect data about active operations of a hypervisor in assigning hardware resources to a plurality of queued virtual machines for use in execution of the plurality of virtual machines, and
   collect pressure data pertaining to maintaining a plurality of resource access queues implemented by the hypervisor, each resource access queue representing an ordered list for assigning one or more of the hardware resources to one or more of the plurality of virtual machines; and
   a monitor configured to cause the at least one processor to, determine, for the hypervisor assigning the hardware resources, whether the pressure data indicates a pressure above a predefined threshold pertaining to one or more of the plurality of hardware resources, and
   indicate an increase in a capacity risk for the hypervisor according to a determined amount of the pressure data above the predefined threshold, the pressure data being based on maintaining the plurality of resource access queues and on a rate of assignment of one or more of the hardware resources being assigned by the hypervisor,
   wherein the capacity risk includes a saturation level pertaining to at least one of the plurality of resource access queues associated with virtual machines contributing to memory pressure and at least one of the plurality of resource access queues associated with virtual machines contributing to processing pressure, the saturation level indicating that at least one of the memory pressure or the processing pressure is increasing, and
   wherein the system uses at least two pressure indexes for determining the capacity risk using a weighted combination of the at least two pressure indexes, each pressure index being a calculated degree of hardware resource usage experienced by the hypervisor during active assignment operations of the hardware resources.

2. The system of claim 1, wherein the pressure data includes information about how the hypervisor assigns and provides memory resources, processing resources, and storage resources for each of the plurality of queued virtual machines.

3. The system of claim 1, wherein the system is further configured to:
   determine, for a portion of hardware resources within a cluster of virtual machines, a combined summary risk, the combined summary risk representing combined data for two or more virtual machines in the cluster;
   determine, that the combined summary risk is above a threshold indicated for pressure data pertaining to at least one calculated pressure index; and
   report, with a report generator and for the cluster of virtual machines, a saturation risk assessment.

4. The system of claim 3, wherein the saturation risk assessment includes a description of steps to alleviate saturation for the cluster of virtual machines.

5. The system of claim 1, wherein determining the capacity risk indicator includes generating, for each hardware resource, a days-to-saturation metric based on a rate of usage for the respective hardware resource.

6. The system of claim 5, wherein determining the capacity risk includes combining the days-to-saturation metric and an associated pressure index for a respective hardware resource.

7. A computer-implemented method comprising:
   collecting data about active operations of a hypervisor in assigning hardware resources to a plurality of queued virtual machines for use in execution of the plurality of virtual machines,
   collecting pressure data pertaining to maintaining a plurality of resource access queues implemented by the hypervisor, each resource access queue representing an ordered list for assigning one or more of the plurality of hardware resources to one or more of the plurality of virtual machines; and
   in response to determining, for the hypervisor that the pressure data indicates a pressure above a predefined threshold pertaining to one or more of the plurality of hardware resources, increasing a capacity risk indicator for the hypervisor based on the determined amount of the pressure data above the predefined threshold, the pressure data being based on maintaining the plurality of resource access queues and on a rate of assignment of one or more of the plurality of hardware resources being assigned by the hypervisor,
   wherein the capacity risk includes a saturation level pertaining to at least one of the plurality of resource access queues associated with virtual machines contributing to memory pressure and at least one of the plurality of resource access queues associated with virtual machines contributing to processing pressure, the saturation level indicating that at least one of the memory pressure or the processing pressure is increasing, and
   wherein at least two pressure indexes are used for determining the capacity risk using a weighted combination of the at least two pressure indexes, each pressure index being a calculated degree of hardware resource usage experienced by the hypervisor during active assignment operations of the hardware resources.

8. The method of claim 7, wherein the pressure data includes information about how the hypervisor assigns and provides memory resources, processing resources, and storage resources for each of the plurality of queued virtual machines.

9. The method of claim 7, further comprising:
   determining, for a portion of hardware resources within a cluster of virtual machines, a combined summary risk, the combined summary risk representing combined data for two or more virtual machines in the cluster;
   determining, that the combined summary risk is above a threshold indicated for pressure data pertaining to at least one calculated pressure index; and
   reporting, with a report generator and for the cluster of virtual machines, a saturation risk assessment.

10. The method of claim 7, wherein the capacity risk includes a saturation level pertaining to at least a portion of the hardware resources.

11. The method of claim 7, wherein determining the capacity risk includes combining the days-to-saturation metric and an associated pressure index for a respective hardware resource.

12. A computer program product including instructions recorded on a non-transitory computer readable storage medium and configured, when executed by at least one processor, to cause the at least one processor to:
collect data about active operations of a hypervisor in assigning hardware resources to a plurality of queued virtual machines for use in execution of the plurality of virtual machines,
collect pressure data pertaining to maintaining a plurality of resource access queues implemented by the hypervisor, each resource access queue representing an ordered list for assigning one or more of the plurality of hardware resources to one or more of the plurality of virtual machines; and in response to determining, for the hypervisor that the pressure data indicates a pressure above a predefined threshold pertaining to one or more of the plurality of hardware resources, increase a capacity risk indicator for the hypervisor based on the determined amount of the pressure data above the predefined threshold, the pressure data being based on maintaining the plurality of resource access queues and on a rate of assignment of one or more of the hardware resources being assigned by the hypervisor,
wherein the capacity risk includes a saturation level pertaining to at least one of the plurality of resource access queues associated with virtual machines contributing to memory pressure and at least one of the plurality of resource access queues associated with virtual machines contributing to processing pressure, the saturation level indicating that at least one of the memory pressure or the processing pressure is increasing, and
wherein at least two pressure indexes are used for determining the capacity risk using a weighted combination of the at least two pressure indexes, each pressure index being a calculated degree of hardware resource usage experienced by the hypervisor during active assignment operations of the hardware resources.

13. The computer program product of claim 12, wherein the pressure data includes information about how the hypervisor assigns and provides memory resources, processing resources, and storage resources for each of the plurality of queued virtual machines.

14. The computer program product of claim 12, further comprising instructions that cause the at least one processor to:
determine, for a portion of hardware resources within a cluster of virtual machines, a combined summary risk, the combined summary risk representing combined data for two or more virtual machines in the cluster;
determine, that the combined summary risk is above a threshold indicated for pressure data pertaining to at least one calculated pressure index; and
report, with a report generator and for the cluster of virtual machines, a saturation risk assessment.

15. The computer program product of claim 12, wherein determining the capacity risk includes combining the days-to-saturation metric and an associated pressure index for a respective hardware resource.

* * * * *

UNITED STATES PATENT AND TRADEMARK OFFICE
CERTIFICATE OF CORRECTION

PATENT NO. : 9,983,900 B2
APPLICATION NO. : 15/335349
DATED : May 29, 2018
INVENTOR(S) : Sivasubramanian et al.

Page 1 of 1

It is certified that error appears in the above-identified patent and that said Letters Patent is hereby corrected as shown below:

On the Title Page

Column 1, Item (*), in "Notice", Line 3, delete "days. days." and insert -- days. --, therefor.

In the Claims

In Column 22, Line 2, Claim 5, delete "risk indicator" and insert -- risk --, therefor.

Signed and Sealed this
Thirty-first Day of July, 2018

Andrei Iancu
*Director of the United States Patent and Trademark Office*